(12) United States Patent
Ferlitsch (10) Patent No.: US 8,358,436 B2
(45) Date of Patent: Jan. 22, 2013

(54) SYSTEMS AND METHODS FOR EFFICIENTLY HANDLING IMAGING JOB SETTINGS

(75) Inventor: Andrew R. Ferlitsch, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1414 days.

(21) Appl. No.: 11/669,802

(22) Filed: Jan. 31, 2007

(65) Prior Publication Data

US 2008/0180721 A1   Jul. 31, 2008

(51) Int. Cl.
*G06F 3/12* (2006.01)
(52) U.S. Cl. ................................. 358/1.9; 358/1.15
(58) Field of Classification Search .................. None
See application file for complete search history.

(56) References Cited

U.S. PATENT DOCUMENTS

| | | | |
|---|---|---|---|
| 5,377,016 A | 12/1994 | Kashiwagi et al. | |
| 5,566,278 A | 10/1996 | Patel et al. | |
| 5,600,762 A | 2/1997 | Salgado et al. | |
| 5,970,223 A * | 10/1999 | Debes et al. | 358/1.16 |
| 6,241,404 B1 | 6/2001 | Fietze et al. | |
| 6,469,795 B2 | 10/2002 | Beaudet et al. | |
| 6,982,804 B2 * | 1/2006 | Frolik et al. | 358/1.15 |
| 2003/0002069 A1 * | 1/2003 | Bhogal et al. | 358/1.15 |
| 2003/0072020 A1 | 4/2003 | Mitsudomi et al. | |
| 2004/0105115 A1 * | 6/2004 | Edwards et al. | 358/1.13 |

FOREIGN PATENT DOCUMENTS

| | | | |
|---|---|---|---|
| EP | 917042 A2 * | 5/1999 | |
| EP | 0704791 | 4/2001 | |
| EP | 1220085 | 7/2002 | |
| GB | 2284319 | 5/1995 | |
| JP | 11170627 | 6/1999 | |
| JP | 2000141823 A * | 5/2000 | |

OTHER PUBLICATIONS

Translation for JP 2000-141823.*

* cited by examiner

*Primary Examiner* — Twyler Haskins
*Assistant Examiner* — Lennin Rodriguez
(74) *Attorney, Agent, or Firm* — Austin Rapp & Hardman (57) ABSTRACT

When an imaging job is received by an imaging device, a modified job environment for the imaging job may be created based on job-specific settings that are specified by the imaging job and also based on default settings of the imaging device. When the imaging job is processed, modified job-specific input source settings of the modified job environment may be provided to an input source subunit that corresponds to the imaging job. The input source subunit may use the modified job-specific input source settings to process the imaging job. Modified job-specific output engine settings of the modified job environment may be provided to an output engine subunit that corresponds to the imaging job. The output engine subunit may use the modified job-specific output engine settings to process the imaging job.

15 Claims, 12 Drawing Sheets

SYSTEMS AND METHODS FOR EFFICIENTLY HANDLING IMAGING JOB SETTINGS

TECHNICAL FIELD

The present disclosure relates generally to computers and computer-related technology. More specifically, the present disclosure relates to imaging devices and document imaging.

BACKGROUND

"Imaging," as the term is used herein, refers to one or more of the processes involved in the display and/or printing of graphics and/or text. The term "imaging device," as used herein, refers to any electronic device that provides functionality related to imaging. Some examples of imaging devices include printers, copiers, scanners, facsimile devices, document servers, image servers, electronic whiteboards, digital cameras, digital projection systems, medical imaging devices, and so forth.

For various reasons, an imaging device may be logically connected to (i.e., placed in electronic communication with) one or more computer systems, which may be referred to as host computer systems (or simply as hosts). For example, a printer may be connected to a network of computer systems. This allows the users of the various computer systems on the network to use the printer.

Different kinds of computer software facilitate the use of imaging devices. The computer or computing device that will be used to image (e.g., print) the materials typically has one or more pieces of software running on the computer that enable it to send the necessary information to the imaging device to enable the materials to be imaged. If the computer or computing device is on a computer network there may be one or more pieces of software running on one or more computers on the computer network that facilitate imaging.

From time to time, an imaging device may receive one or more jobs from a host. The term "imaging job" may refer to an imaging-related task that is performed by an imaging device. For example, a print job may be a single document or a set of documents that is submitted to a printer for printing.

As indicated above, the present disclosure relates to imaging devices and document imaging. More specifically, the present disclosure relates to systems and methods for efficiently handling imaging job settings.

DETAILED DESCRIPTION

A method for efficiently handling imaging job settings is disclosed. When an imaging job is received by an imaging device, a modified job environment for the imaging job may be created based on job-specific settings that are specified by the imaging job and also based on default settings of the imaging device. When the imaging job is processed, modified job-specific input source settings of the modified job environment may be provided to an input source subunit that corresponds to the imaging job. The input source subunit may use the modified job-specific input source settings to process the imaging job. Modified job-specific output engine settings of the modified job environment may be provided to an output engine subunit that corresponds to the imaging job. The output engine subunit may use the modified job-specific output engine settings to process the imaging job.

The imaging device may support multiple imaging functions. The imaging job and the modified job environment may be represented in an extensible markup language (XML) format.

The job-specific settings that are specified by the imaging job may include job-specific general settings, job-specific input source settings, and job-specific output engine settings. The imaging job may be parsed to extract the job-specific settings.

In order to create the modified job environment, default general settings for the imaging device, default input source settings of the input source subunit, and default output engine settings of the output engine subunit may be retrieved. Job-specific general settings that are specified by the imaging job may be merged with the default general settings for the imaging device to produce modified job-specific general settings. Job-specific input source settings that are specified by the imaging job may be merged with the default input source settings of the input source subunit to produce the modified job-specific input source settings. Job-specific output engine settings that are specified by the imaging job may be merged with the default output engine settings of the output engine subunit to produce the modified job-specific output engine settings. The modified job environment may be associated with the imaging job.

A job instance sub-process may be created to manage processing of the imaging job. Imaging data for the imaging job and the modified job environment for the imaging job may be passed to the job instance sub-process.

The input source subunit may cache at least some of the modified job-specific input source settings. The output engine subunit may cache at least some of the modified job-specific output engine settings. Modified job-specific general settings of the modified job environment may be provided to a host communications subunit.

The imaging job may be queued. If this occurs, the job-specific general settings that may be specified by the imaging job may be used to convey information about the imaging job.

A separate modified job environment and a separate job instance sub-process may be created for each new imaging job. In response to detecting a contention, startup of another imaging job may be delayed.

The imaging job may take input from multiple input source subunits. The imaging job may provide output to multiple output engine subunits.

An imaging device that is configured to efficiently handle imaging job settings is also disclosed. The imaging device includes a processor and memory in electronic communication with the processor. Instructions may be stored in the memory. The instructions may be executable to receive an imaging job. The instructions may also be executable to create a modified job environment for the imaging job based on job-specific settings that are specified by the imaging job and also based on default settings of the imaging device. The instructions may also be executable to provide modified job-specific input source settings of the modified job environment to an input source subunit that corresponds to the imaging job. The input source subunit may use the modified job-specific input source settings to process the imaging job. The instructions may also be executable to provide modified job-specific output engine settings of the modified job environment to an output engine subunit that corresponds to the imaging job. The output engine subunit may use the modified job-specific output engine settings to process the imaging job.

A computer-readable medium is also disclosed. The computer-readable medium may include executable instructions for receiving an imaging job. The computer-readable medium may also include executable instructions for creating a modified job environment for the imaging job based on job-specific settings that are specified by the imaging job and also based on default settings of the imaging device. The computer-readable medium may also include executable instructions for providing modified job-specific input source settings of the modified job environment to an input source subunit that corresponds to the imaging job. The input source subunit may use the modified job-specific input source settings to process the imaging job. The computer-readable medium may also include executable instructions for providing modified job-specific output engine settings of the modified job environment to an output engine subunit that corresponds to the imaging job. The output engine subunit may use the modified job-specific output engine settings to process the imaging job.

The word "exemplary" is used exclusively herein to mean "serving as an example, instance or illustration." Any embodiment described as "exemplary" is not necessarily to be construed as preferred or advantageous over other embodiments.

As used herein, the terms "an embodiment," "embodiment," "embodiments," "the embodiment," "the embodiments," "one or more embodiments," "some embodiments," "certain embodiments," "one embodiment," "another embodiment" and the like mean "one or more (but not necessarily all) embodiments," unless expressly specified otherwise.

The term "determining" (and grammatical variants thereof) is used in an extremely broad sense. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

Figure 1:
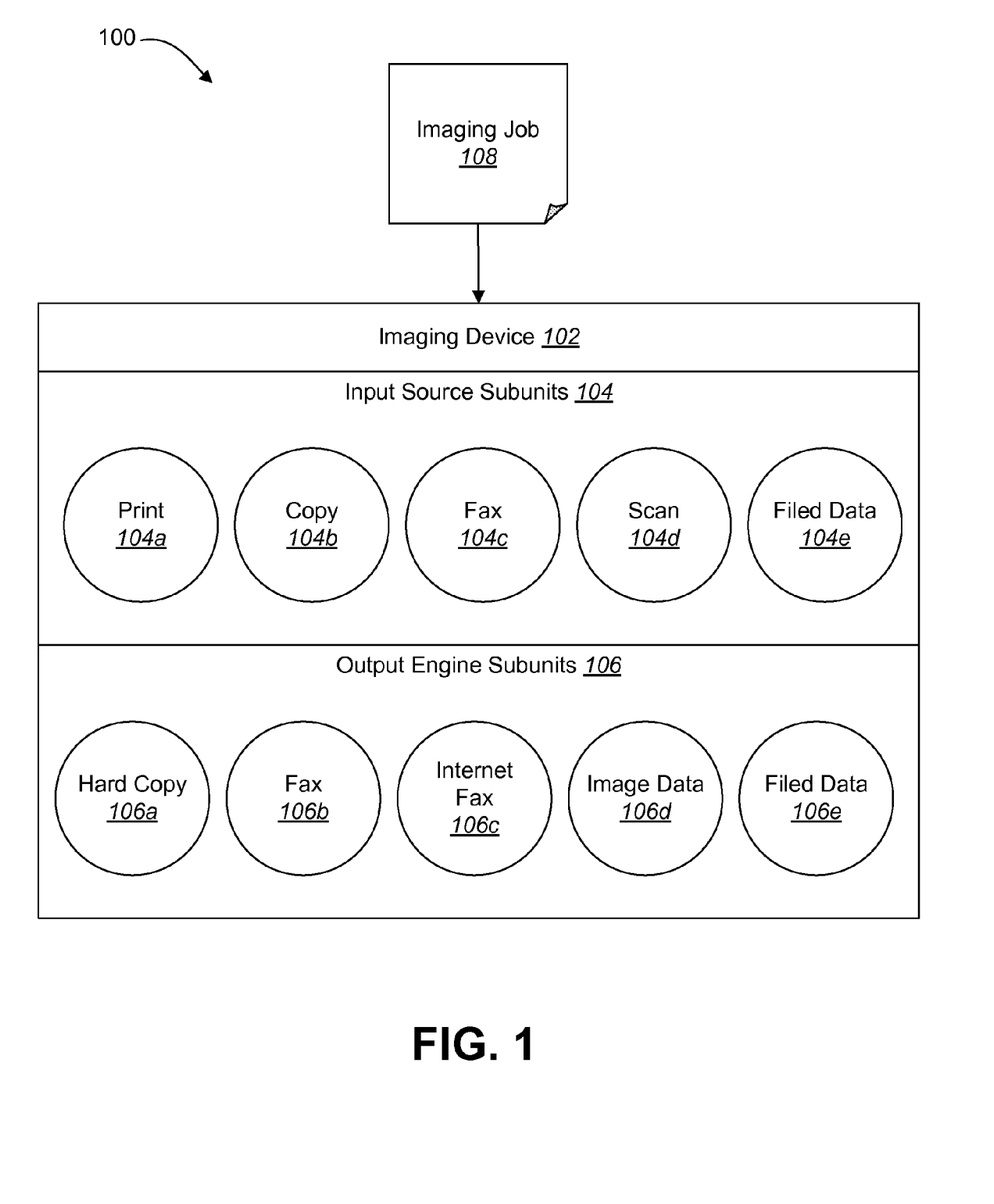
FIG. 1 illustrates an exemplary operating environment in which embodiments may be practiced.

FIG. 1 illustrates an exemplary operating environment 100 in which embodiments may be practiced. The depicted operating environment 100 includes an imaging device 102. The imaging device 102 may be configured to support multiple imaging functions. An imaging device 102 that supports multiple imaging functions may be referred to as a multi-function peripheral (MFP).

Each imaging function in the imaging device 102 may be supported by an imaging unit. Some examples of imaging units include a scanner, a printer, a copier, a facsimile device, a filing device, a publishing device, a format converter, a digital camera, a digital video camera, a digital audio recorder, an electronic white board, a CD-writer, a DVD recorder, a client computing device, a server computing device, etc.

Each imaging unit in the imaging device 102 may include an input source subunit 104. The imaging device 102 that is shown in FIG. 1 includes the following input source subunits 104: a print input source subunit 104a, a copy input source subunit 104b, a fax input source subunit 104c, a scan input source subunit 104d, and a filed data input source subunit 104e. Of course, embodiments may be practiced in an imaging device 102 that includes other types of input source subunits 104. Some other examples of input source subunits 104 include an image data input source subunit, a page description language (PDL) input source subunit, etc.

Each imaging unit in the imaging device 102 may include an output engine subunit 106. The imaging device 102 that is shown in FIG. 1 includes the following output engine subunits 106: a hard copy output engine subunit 106a, a fax output engine subunit 106b, an Internet fax output engine subunit 106c, an image data output engine subunit 106d, a filed data output engine subunit 106e, and a digital image projection output engine subunit (not shown). Of course, embodiments may be practiced in an imaging device 102 that includes other types of output engine subunits 106.

An input source subunit 104 and/or an output engine subunit 106 may be shared between multiple imaging units. For example, a printer unit and a copier unit may share the hard-copy output engine subunit 106a. As another example, an image send unit and a copier unit may share the scan input source subunit 104d.

The imaging device 102 may be capable of receiving input specifying an imaging job 108 which the imaging device 102 is capable of rendering and outputting. An imaging job 108 may be supported as a web service. An imaging job 108 may be represented in the extensible markup language (XML) format, and communication about an imaging job 108 may follow the Simple Object Access Protocol (SOAP). Alternatively, other formats may be used. For example, the Hyper Text Transfer Protocol (HTTP) and/or a proprietary data format may be used.

Figure 2:
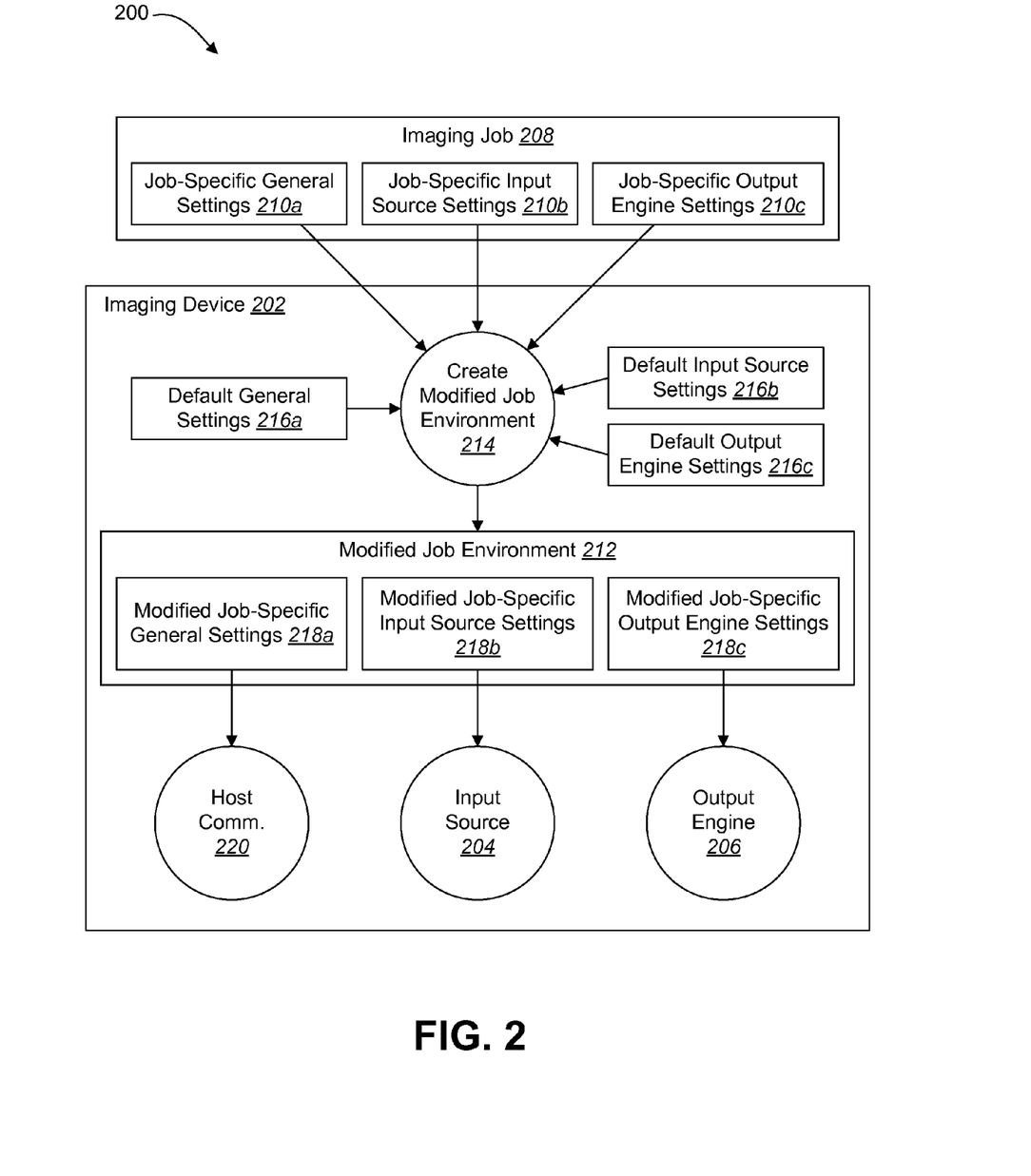
FIG. 2 illustrates a system for efficiently handling imaging job settings.

FIG. 2 illustrates an embodiment of a system 200 for efficiently handling imaging job settings. An imaging device 202 may receive an imaging job 208. The imaging job 208 may correspond to one or more input source subunits 104 and one or more output engine subunits 106. The imaging job 208 may specify a number of job-specific settings 210. For example, the imaging job 208 may specify job-specific general settings 210a, i.e., settings that are not related to a specific input source subunit 104 or output engine subunit 106. The imaging job 208 may also specify job-specific input source settings 210b, i.e., settings that are associated with an input source subunit 104 that corresponds to the imaging job 208. The imaging job 208 may also specify job-specific output engine settings 210c, i.e., settings that are associated with an output engine subunit 106 that corresponds to the imaging job 208.

A modified job environment 212 for the imaging job 208 may be created. One or more processes 214 on the imaging device 202 may be involved in the creation of the modified job environment 212. The modified job environment 212 may be created based on the job-specific settings 210 that are specified by the imaging job 208, and also based on default settings 216 of the imaging device 202. For example, the modified job environment 212 may include modified job-specific general settings 218a that are based on job-specific general settings 210a specified by the imaging job 208 and default general settings 216a of the imaging device 202. The modified job environment 212 may include modified job-specific input source settings 218b that are based on job-specific input source settings 210b specified by the imaging job 208 and default input source settings 216b of the imaging device 202. The modified job environment 212 may include modified job-specific output engine settings 218c that are based on job-specific output engine settings 210c specified by the imaging job 208 and default output engine settings 216c of the imaging device 202.

When the imaging job 208 is processed, the modified job-specific general settings 218a of the modified job environment 212 may be provided to a host communications subunit 220 of the imaging device 202. The modified job-specific input source settings 218b of the modified job environment 212 may be provided to an input source subunit 204 that corresponds to the imaging job 208. The modified job-specific output engine settings 218c of the modified job environment 212 may be provided to an output engine subunit 206 that corresponds to the imaging job 208.

The host communications subunit 220 may use the modified job-specific general settings 218a to perform tasks such as sending job progress/status notifications to the job originator, obtaining authorization to image the job, sending job accounting information to an accounting process, performing job auditing, sending requests to the host, etc. The input source subunit 204 may use the modified job-specific input source settings 218b to process the imaging job 208. Similarly, the output engine subunit 206 may use the modified job-specific output engine settings 218c to process the imaging job 208.

Figure 3:
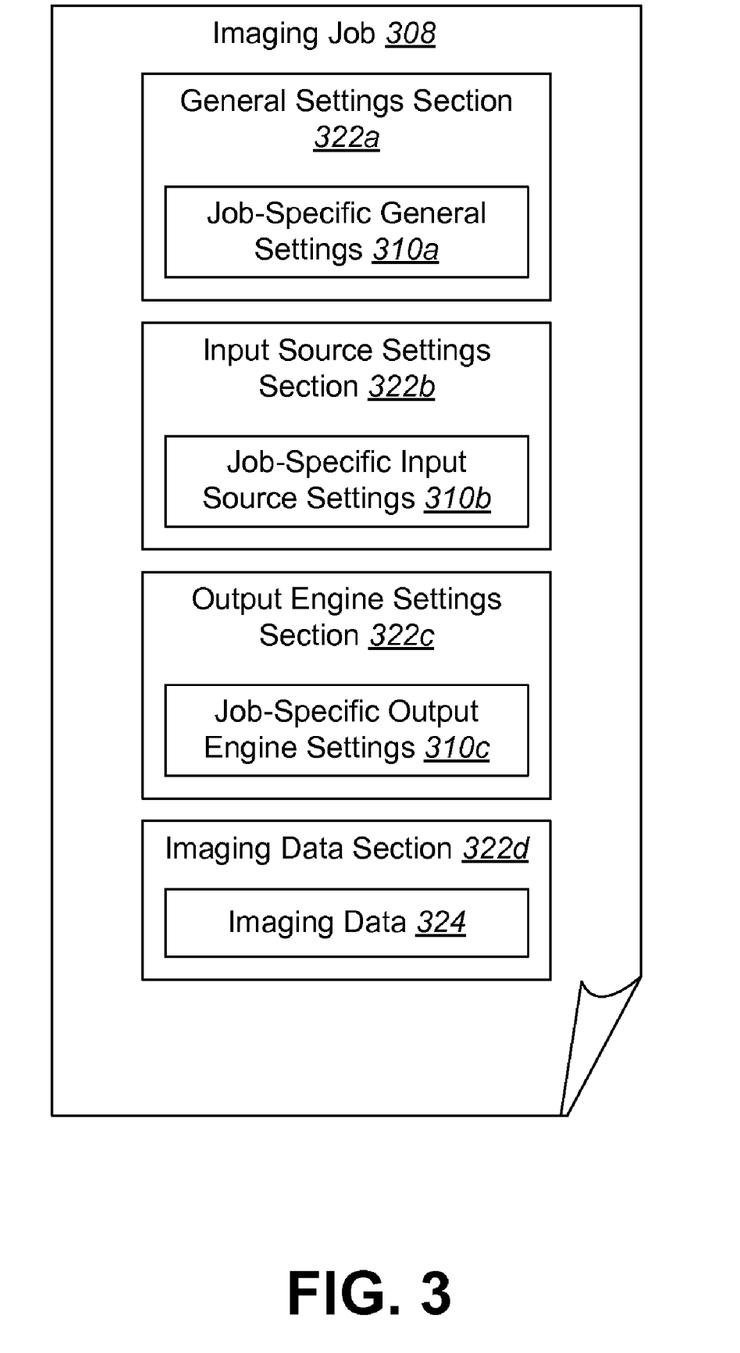
FIG. 3 illustrates an exemplary configuration for an imaging job.

FIG. 3 illustrates an exemplary configuration for an imaging job 308. Different job-specific settings 310 that are specified by the imaging job 308 may be included within different sections 322 of the imaging job 308. In particular, the imaging job 308 may include a general settings section 322a, an input source settings section 322b, and an output engine settings section 322c. Job-specific general settings 310a may be included within the general settings section 322a of the imaging job 308. Job-specific input source settings 310b may be included within the input source settings section 322b of the imaging job 308. Job-specific output engine settings 310c may be included within the output engine settings section 322c of the imaging job 308. Of course, in an alternative embodiment, an imaging job 308 may include sections 322 other than those that are shown in FIG. 3.

As indicated above, the imaging job 308 may be represented in the XML format. Where the imaging job 308 is represented in the XML format, each section 322 of the imaging job 308 may correspond to an XML container.

The job-specific general settings 310a for the imaging job 308 may include settings that are not related to a specific input source subunit 104 or to a specific output engine subunit 106. Many different kinds of job-specific general settings 310a may be utilized with embodiments disclosed herein. Some examples of job-specific general settings 310a include: identification of the originator of the imaging job 308 (e.g., user and host), identification of the imaging job 308 (e.g., an imaging job identifier and an imaging job name); identification of a document corresponding to the imaging job 308 (e.g., document name), authentication (e.g., username and password), accounting (e.g., accounting codes), notification (e.g., types of notifications to send and where to send them), security (e.g., type of encryption, public keys, etc), scheduling (e.g., when to render/output the imaging job 308), timestamp (e.g., when the imaging job 308 was created), etc. Of course, other types of job-specific general settings 310a may be specified by the imaging job 308.

The job-specific input source settings 310b for the imaging job 308 may include settings that are associated with an input source subunit 104 that corresponds to the imaging job 308. Many different kinds of job-specific input source settings 310b may be utilized with embodiments disclosed herein. Some examples of job-specific input source settings 310b for a scan input source subunit 104d include settings related to the size of the document to scan, settings related to double-sided scanning, settings related to the exposure mode and level, image rotation settings, clipping settings, image splitting settings, scan job build settings, etc. Some examples of job-specific input source settings 310b for a PDL input source subunit include resolution enhancement settings, half tone enhancement settings, economy mode settings, hold page settings, job retention settings, etc. Some examples of job-specific input source settings 310b for a filed data input source subunit 104e include the location of filed data, password access to filed data, etc. Of course, other types of job-specific input source settings 310b may be specified by the imaging job 308.

The job-specific output engine settings 310c for the imaging job 308 may include settings that are associated with an output engine subunit 106 that corresponds to the imaging job 308. Many different kinds of job-specific output engine settings 310c may be utilized with embodiments disclosed herein. Some examples of job-specific output engine settings 310c for the hard copy output engine subunit 106a include settings related to the number of hard copies to be made, copy collation settings, paper source settings, duplex printing settings, document layout settings, margin shift settings, front cover settings, back cover settings, transparency insert settings, tab printing settings, carbon printing settings, mirror image printing settings, black-and-white reverse printing settings, document indicia settings, output bin settings, offsetting (jog) settings, stapling settings, hole punching settings, folding settings, etc. Some examples of job-specific output engine settings 310c for the image data output engine subunit 106d include image data format settings, compression method settings, encoding settings, resolution settings, number of images per file settings, image size settings, image layout settings, image destination settings, etc. Some examples of job-specific output engine settings 310c for the filed data output engine subunit 106e include settings related to the location to store filed data, settings related to the owner of the filed data, settings related to the password to protect the filed data, etc. Of course, other types of job-specific output engine settings 310c may be specified by the imaging job 308.

The imaging job 308 may also include imaging data 324 that corresponds to the imaging job 308. The imaging data 324 may be included in an imaging data section 322d. Alternatively, the imaging data section 322d of the imaging job 308 may specify the location of the imaging data 324 for the imaging job 308. For example, the imaging data section 322d may include an address reference to the imaging data 324 (e.g., a uniform resource locator). Where the imaging data section 322d specifies the location of the imaging data 324, the imaging device 102 may pull the imaging data 324 when the imaging job 308 is being processed. The imaging data 324 may be pulled either immediately or on-demand when needed.

Figure 4:
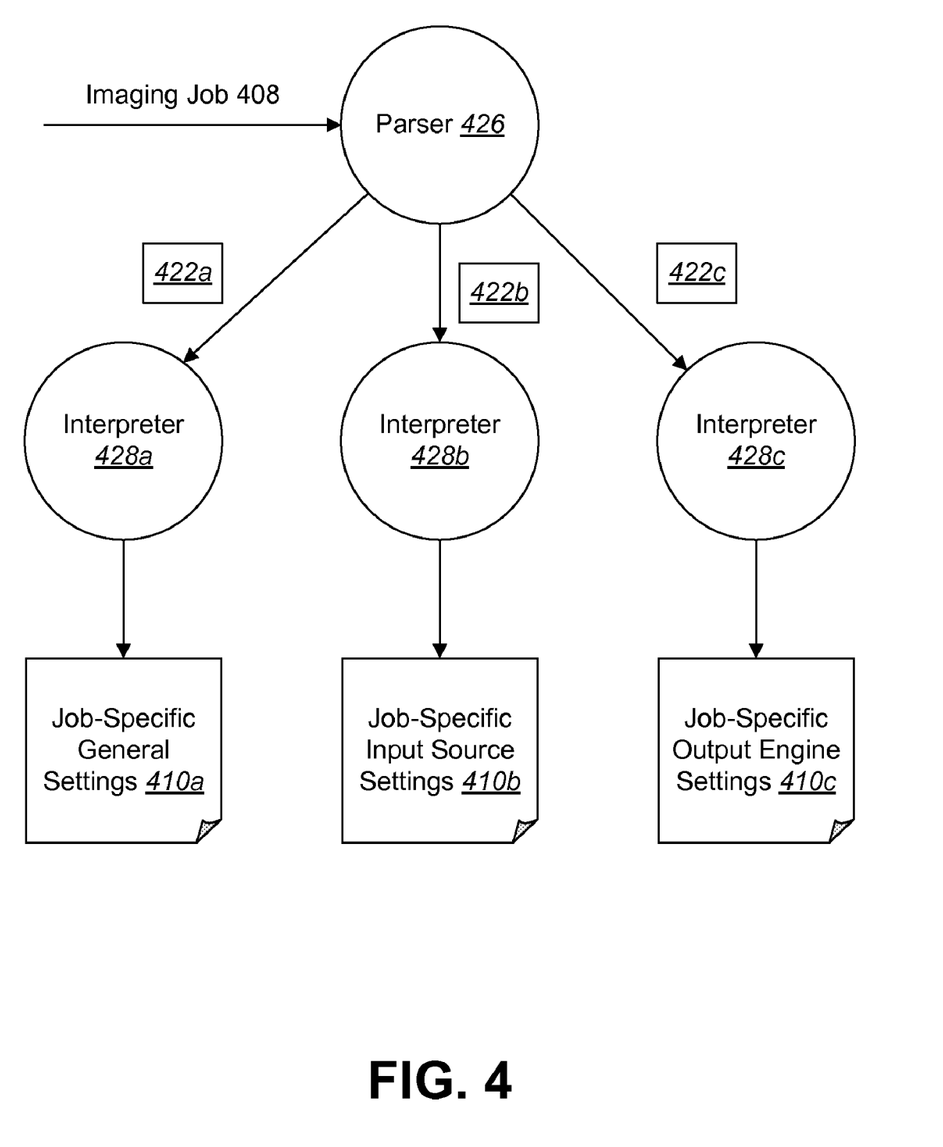
FIG. 4 illustrates how an imaging job may initially be dealt with when it is received by an imaging device.

FIG. 4 illustrates how an imaging job 408 may initially be dealt with when it is received by an imaging device 102. A parser 426 may parse the imaging job 408 and extract a general settings section 422a, an input source settings section 422b, and an output engine settings section 422c. An interpreter 428a may interpret the general settings section 422a to obtain job-specific general settings 410a of the imaging job 408. Another interpreter 428b may interpret the input source settings section 422b to obtain job-specific input source settings 410b of the imaging job 408. Another interpreter 428c may interpret the output engine settings section 422c to obtain job-specific output engine settings 410c of the imaging job 408. Where each section 422 of the imaging job 408 corresponds to an XML container, the interpreters 428 that are utilized to interpret the different sections 422 of the imaging job 408 may be configured to interpret XML data.

FIG. 4 shows different interpreters 428a, 428b, 428c being utilized to interpret the different sections 422a, 422b, 422c of the imaging job 408. Alternatively, the same interpreter 428 may be utilized to interpret multiple sections 422 of the imaging job 408.

Figure 5A:
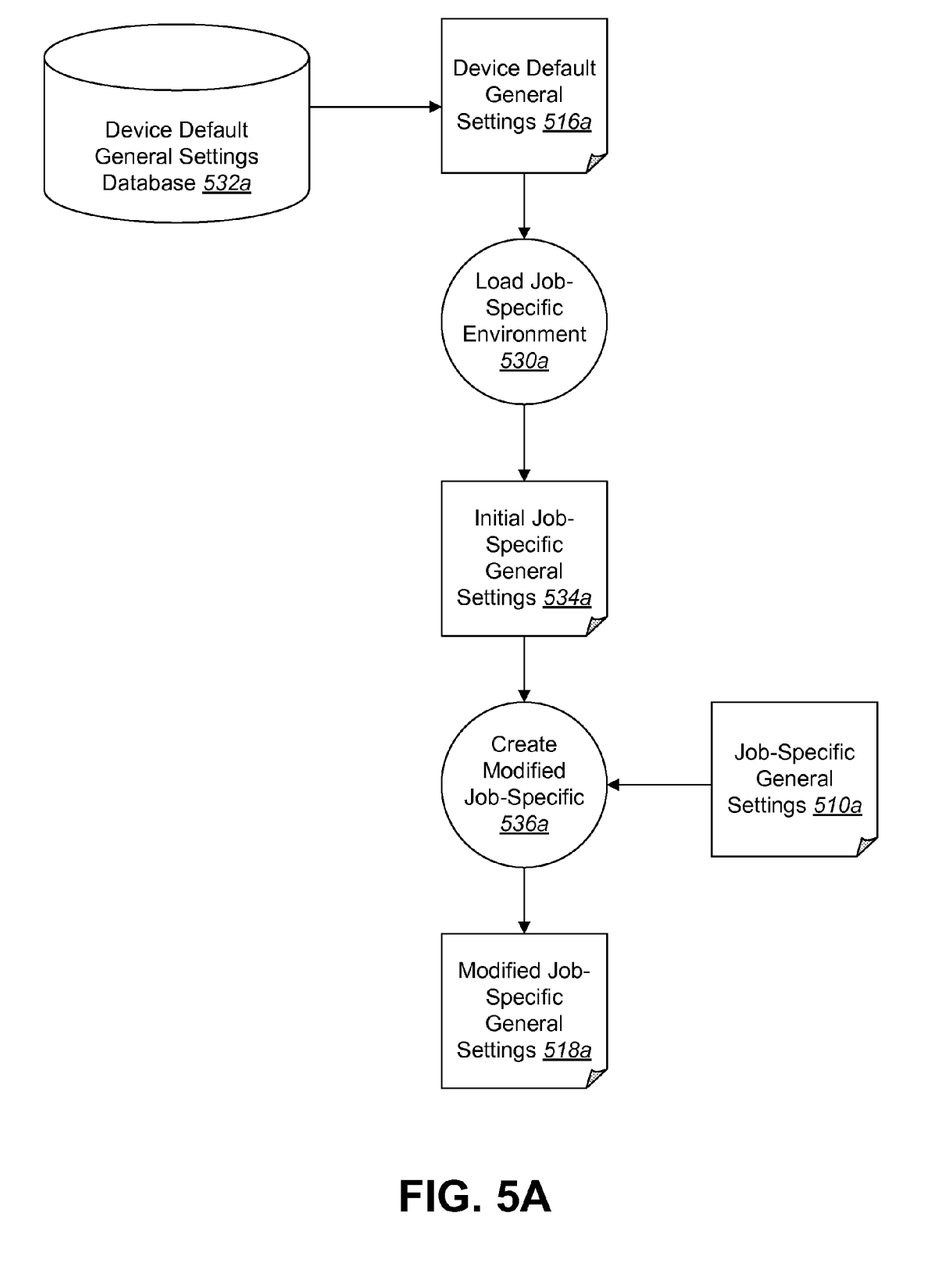
FIGS. 5A through 5C illustrate how a modified job environment may be created.
Figure 5B:
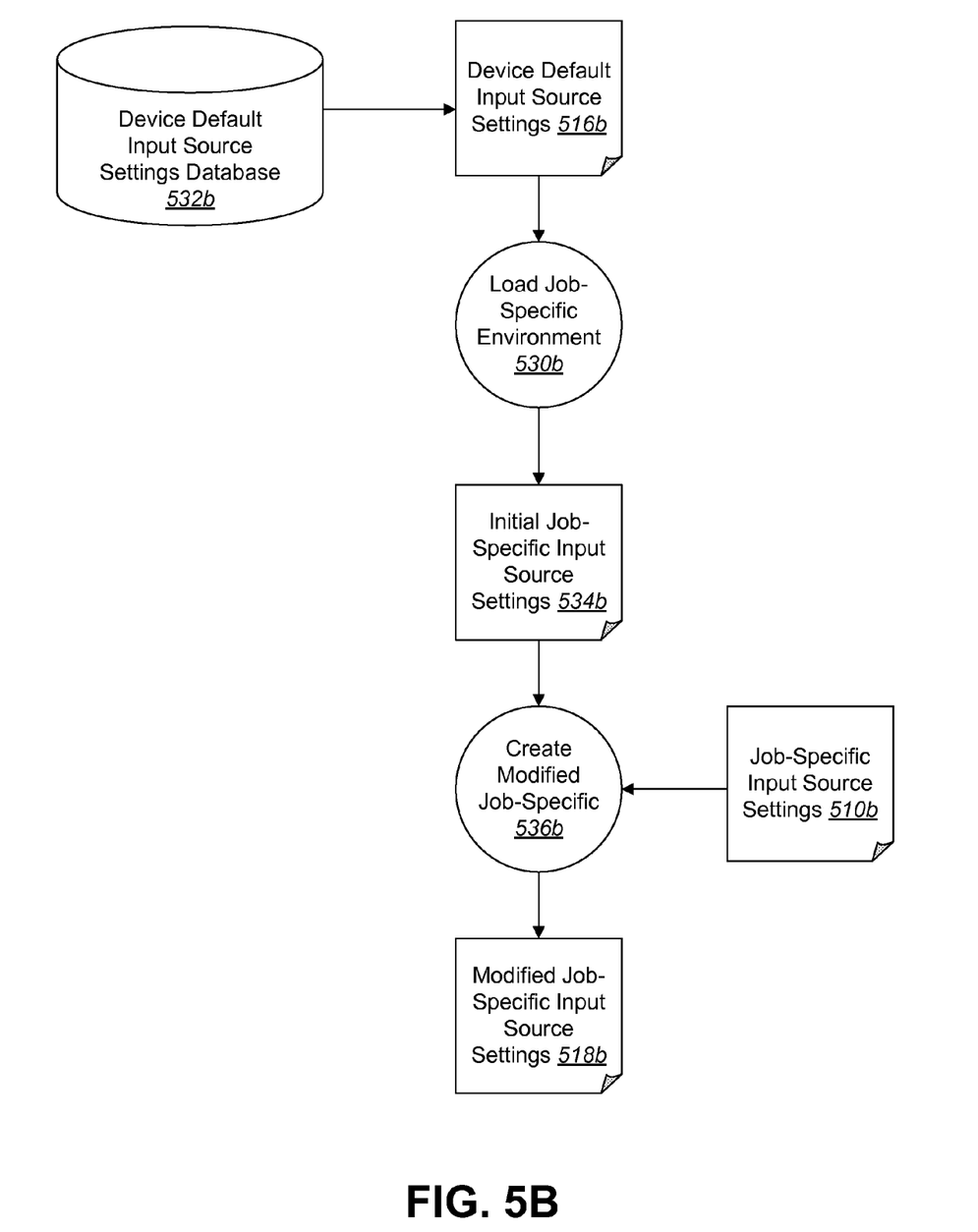
Figure 5C:
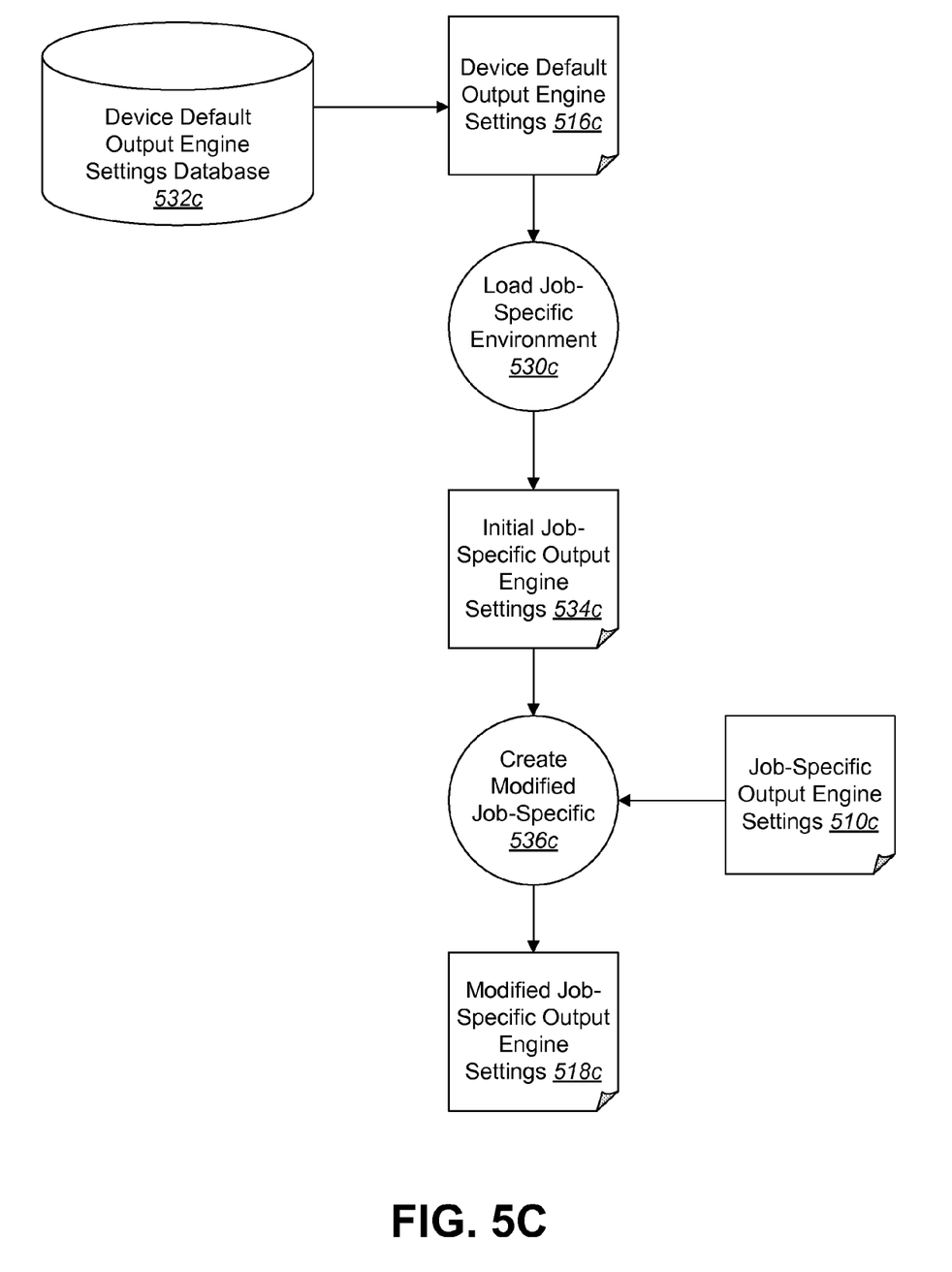

FIGS. 5A through 5C illustrate how a modified job environment 212 may be created. The modified job environment 212 may include modified job-specific general settings 518a, modified job-specific input source settings 518b, and modified job-specific output engine settings 518c. FIG. 5A illustrates how the modified job-specific general settings 518a of the modified job environment 212 may be created. FIG. 5B illustrates how the modified job-specific input source settings 518b of the modified job environment 212 may be created. FIG. 5C illustrates how the modified job-specific output engine settings 518c of the modified job environment 212 may be created.

Referring initially to FIG. 5A, one or more processes 530a on an imaging device 102 may be utilized to retrieve default general settings 516a of the imaging device 102 from a database 532a. In FIG. 5A, this database 532a is labeled as a device default general settings database 532a. The default general settings 516a of the imaging device 102 may be loaded as the initial job-specific general settings 534a for the imaging job 108. One or more processes 536a on the imaging device 102 may be utilized to merge the job-specific general settings 510a that are specified by the imaging job 108 into the initial job-specific general settings 534a, thereby obtaining the modified job-specific general settings 518a for the modified job environment 212.

Referring now to FIG. 5B, one or more processes 530b on the imaging device 102 may be utilized to retrieve the default input source settings 516b of the imaging device 102 from a database 532b. In FIG. 5B, this database 532b is labeled as a device default input source settings database 532b. The default input source settings 516b of the imaging device 102 may be loaded as the initial job-specific input source settings 534b for the imaging job 108. One or more processes 536b on the imaging device 102 may be utilized to merge the job-specific input source settings 510b that are specified by the imaging job 108 into the initial job-specific input source settings 534b, thereby obtaining the modified job-specific input source settings 518b for the modified job environment 212.

Referring now to FIG. 5C, one or more processes 530c on the imaging device 102 may be utilized to retrieve the default output engine settings 516c of the imaging device 102 from a database 532c. In FIG. 5C, this database 532c is labeled as a device default output engine settings database 532c. The default output engine settings 516c of the imaging device 102 may be loaded as the initial job-specific output engine settings 534c for the imaging job 108. One or more processes 536c on the imaging device 102 may be utilized to merge the job-specific output engine settings 510c that are specified by the imaging job 108 into the initial job-specific output engine settings 534c, thereby obtaining the modified job-specific output engine settings 518c for the modified job environment 212.

Figure 6:
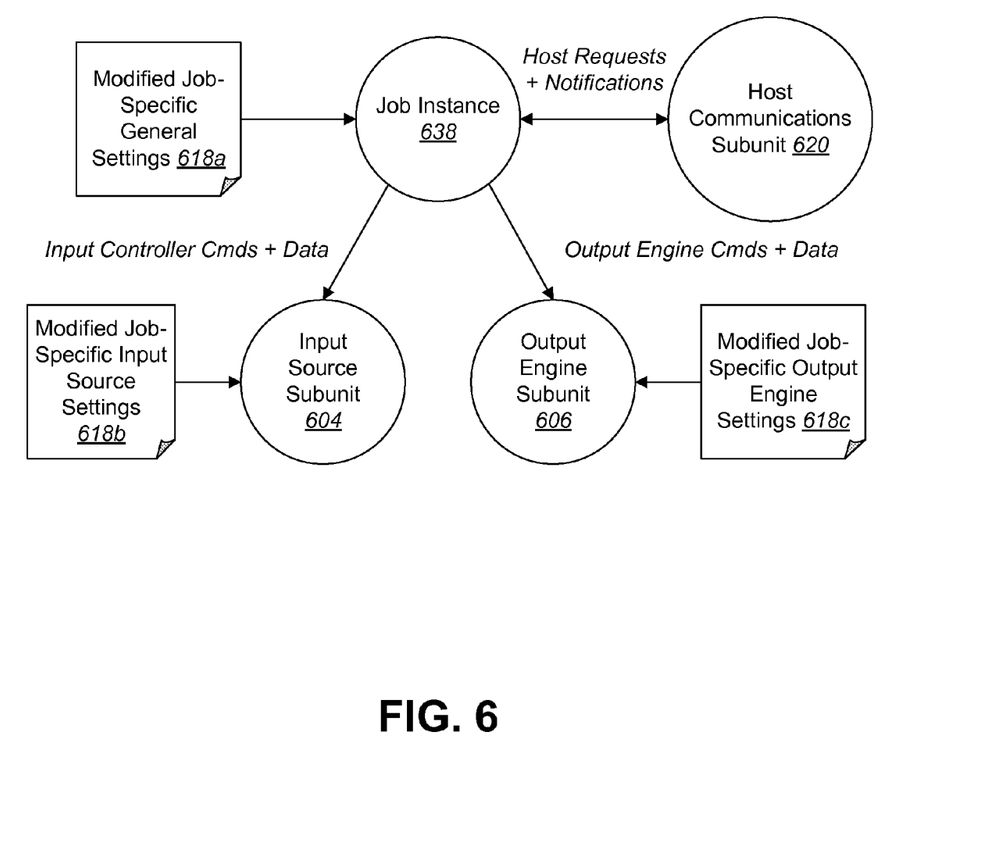
FIG. 6 illustrates how a modified job environment may be utilized while the corresponding imaging job is being processed.

FIG. 6 illustrates how the modified job environment 212 may be utilized while an imaging job 108 is being processed. The processing of the imaging job 108 may be under the control of a job control manager (not shown). The job control manager may create a job instance sub-process 638 (e.g., a processing thread) to manage the processing of the imaging job 108. The job control manager may pass the imaging data 324 and the modified job environment 212 to the job instance sub-process 638. The job instance sub-process 638 may communicate with (at least) a host communications subunit 620, an input source subunit 604 that corresponds to the imaging job 108, and an output engine subunit 606 that corresponds to the imaging job 108.

Modified job-specific general settings 618a, which may be associated with the job instance sub-process 638, may be passed to the host communications subunit 620. If the modified job-specific general settings 618a are represented in the XML format, the host communications subunit 620 may parse the XML data to obtain the modified job-specific general settings 618a. The extracted settings 618a may then be cached by the subunit 620 or re-parsed each time they are referenced. The subunit 620 may use the settings to perform tasks such as sending job progress/status notifications to the job originator, obtaining authorization to image the job, sending job accounting information to an accounting process, sending requests to the host, etc.

The modified job-specific input source settings 618b, which may be associated with the job instance sub-process 638, may be passed to an input source subunit 604 that corresponds to the imaging job 108. If the modified job-specific input source settings 618b are represented in the XML format, the input source subunit 604 may parse the XML data to obtain the modified job-specific input source settings 618b. The extracted settings 618b may then be cached by the subunit 604 or re-parsed each time they are referenced. The settings 618b may be used for control of the input source subunit 604 in a manner specific to the job instance 638.

The modified job-specific output engine settings 618c, which may be associated with the job instance sub-process 638, may be passed to an output engine subunit 606 that corresponds to the imaging job 108. If the modified job-specific output engine settings 618c are represented in the XML format, the output engine subunit 606 may parse the XML data to obtain the modified job-specific output engine settings 618c. The extracted settings 618c may then be cached by the subunit 606 or re-parsed each time they are referenced. The settings 618c may be used for control of the output engine subunit 606 in a manner specific to the job instance 638.

Figure 7:
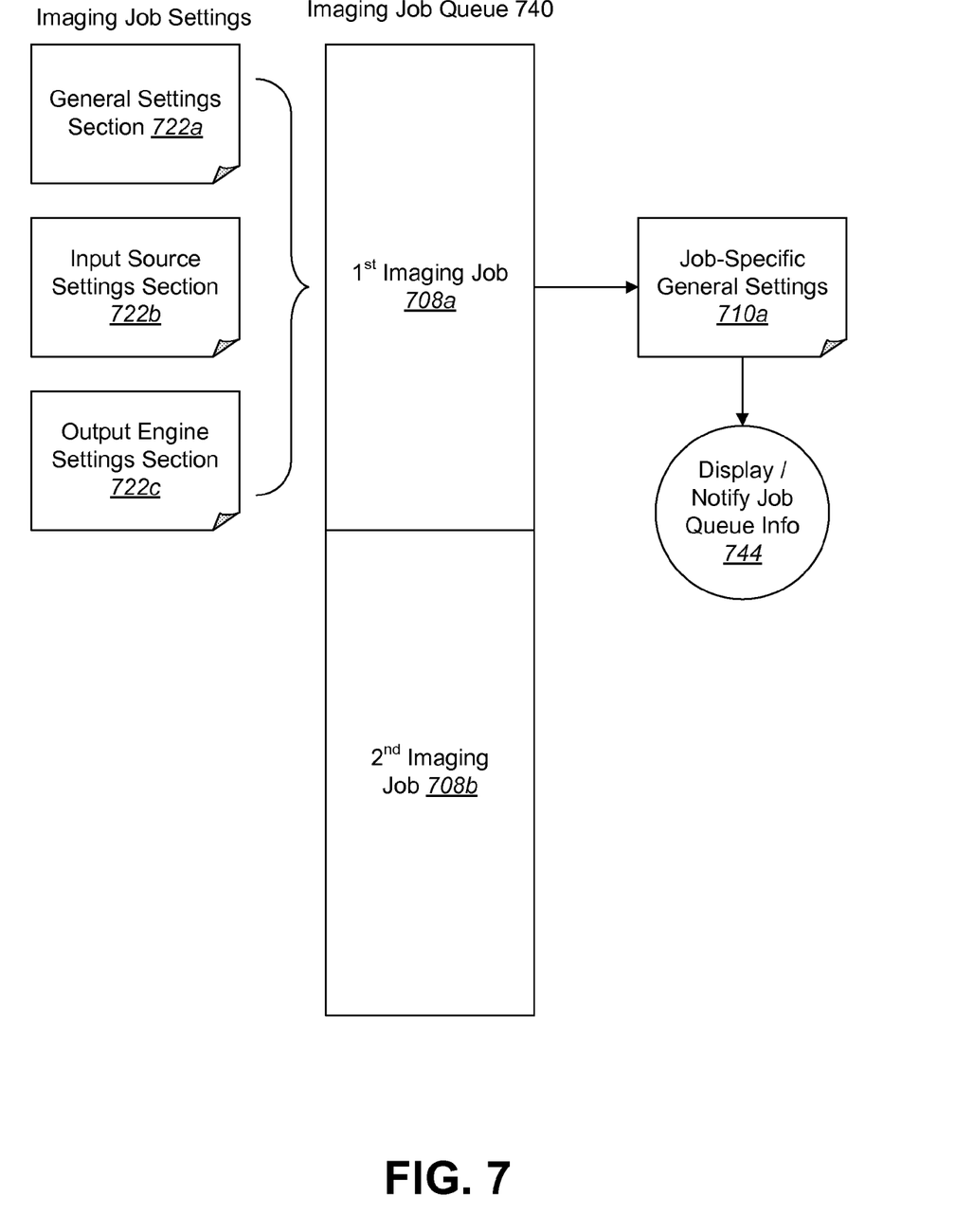
FIG. 7 shows how an imaging job may be dealt with if it is not immediately processed.

Under some circumstances, an imaging job 108 may not be immediately processed after it has been received. Instead, the imaging job 108 may be queued, either internally or externally. FIG. 7 shows how an imaging job 708a may be dealt with if it is not immediately processed. FIG. 7 shows a first imaging job 708a after it has been added to an imaging job queue 740. A second imaging job 708b is also shown in the imaging job queue 740.

When the first imaging job 708a is queued, an imaging data section 322d (not shown in FIG. 7) of the imaging job 708a may be stored in a data repository (not shown). An input source settings section 722b and an output engine settings section 722c of the imaging job 708a may be stored in the same data repository, or in another data repository.

A general settings section 722a of the imaging job 708a may be stored in the imaging job queue 740. The associated entry in the imaging job queue 740 may also include information about where to locate the corresponding imaging data section 322d, the input source settings section 722b, and the output engine settings section 722c.

Prior to processing, the imaging job queue 740 may be used to provide information on the queued imaging job 708a, such as from the control panel of the imaging device 102 or from a remote interface of the imaging device 102 (e.g., an embedded web page). When information on the queued imaging job 708a is displayed, or otherwise requested, one or more processes 744 on the imaging device 102 may be utilized to obtain the job-specific general settings 710a for the imaging job 708a. The job-specific general settings 710a may then be parsed to produce the pertinent information for a display, notification or other request.

The modified job environment 212 for an imaging job 108 may be kept with the imaging job 108 instead of being stored in a centralized repository. Accordingly, the methods described herein may support parallel processing of multiple imaging jobs 108 of either the same job type, or where jobs share the same input source subunit 104 or output engine subunit 106.

Figure 8:
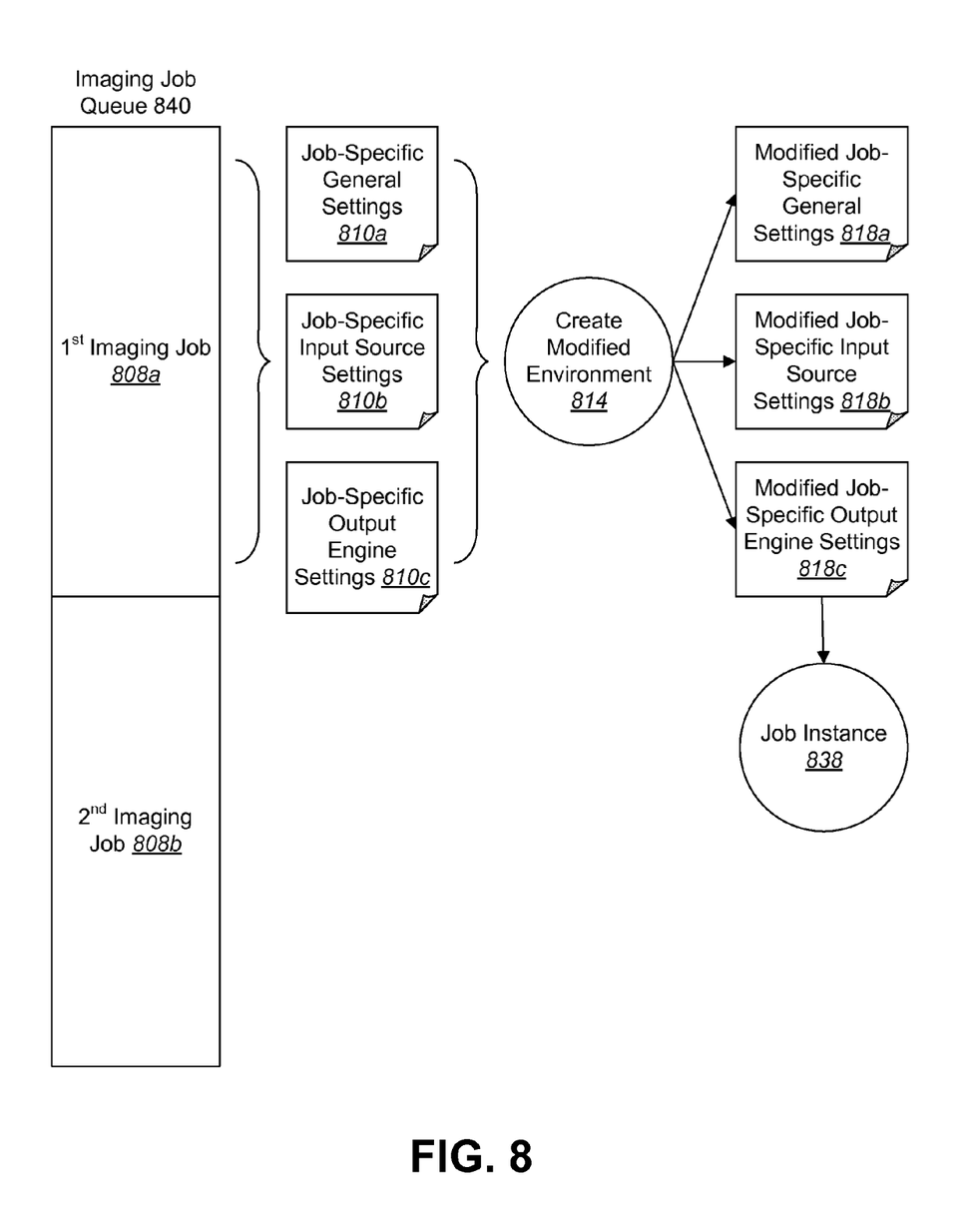
FIG. 8 illustrates how multiple imaging jobs may be processed in parallel.

FIG. 8 illustrates how multiple imaging jobs 808 may be processed in parallel. A first imaging job 808a and a second imaging job 808b are shown stored in an imaging job queue 840. Processing of the first imaging job 808a can start by extracting job-specific general settings 810a, job-specific input source settings 810b, and job-specific output engine settings 810c of the imaging job 808a. These settings 810a, 810b, 810c may be extracted from the imaging job queue 840. The modified job environment 212 may be created 814, and the modified job environment 212, which may include modified job specific settings 818a, 818b and 818c, may be passed to the job control manager (not shown). The job control manager may create a job instance sub-process 838 and pass control of the imaging job 808a to the job instance sub-process 838. These steps may then be repeated for the second imaging job 808b (and for each new imaging job 808) in parallel, until the job control manager detects a contention. When the job control manager detects a contention, it may delay the startup of another imaging job 808 until the contention is resolved. Some examples of contentions include the availability of memory, the availability of storage, the availability of an input source subunit 104, the availability of an output engine subunit 106, etc.

Figure 9:
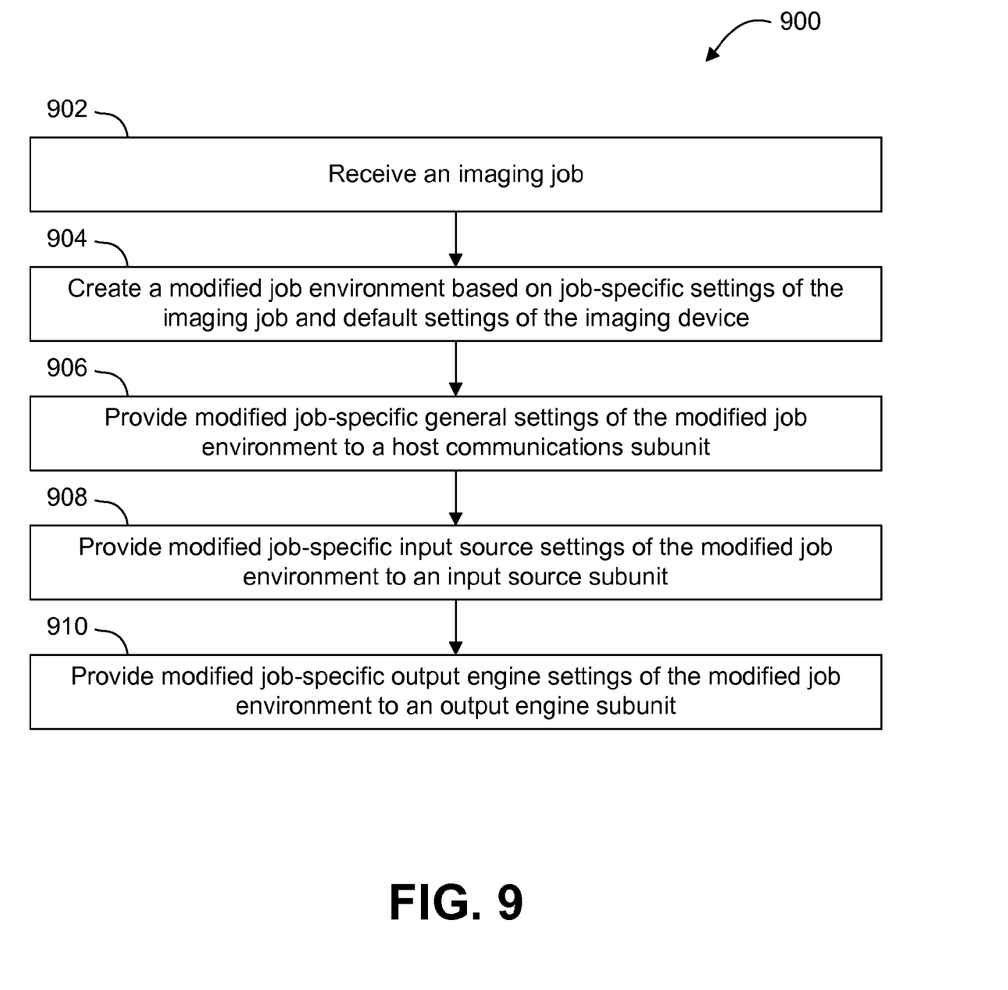
FIG. 9 illustrates a method for handling imaging job settings.

FIG. 9 illustrates an embodiment of a method 900 for efficiently handling imaging job settings. The method 900 may be implemented by an imaging device 102.

In accordance with the method 900, an imaging job 108 may be received 902. The imaging job 108 may specify a number of job-specific settings 210. For example, the imaging job 108 may specify job-specific general settings 210a, job-specific input source settings 210b, and job-specific output engine settings 210c.

A modified job environment 212 for the imaging job 108 may be created 904. The modified job environment 212 may be created 904 based on the job-specific settings 210 that are specified by the imaging job 108 and also based on the default settings 216 of the imaging device 102. For example, the modified job environment 212 may include modified job-specific general settings 218a that are based on job-specific general settings 210a specified by the imaging job 108 and default general settings 216a of the imaging device 102. The modified job environment 212 may include modified job-specific input source settings 218b that are based on job-specific input source settings 210b specified by the imaging job 108 and default input source settings 216b of the imaging device 102. The modified job environment 212 may include modified job-specific output engine settings 218c that are based on job-specific output engine settings 210c specified by the imaging job 108 and default output engine settings 216c of the imaging device 102.

When the imaging job 108 is processed, the modified job-specific general settings 218a of the modified job environment 212 may be provided 906 to a host communications subunit 220 of the imaging device 102. The modified job-specific input source settings 218b of the modified job environment 212 may be provided 908 to an input source subunit 204 that corresponds to the imaging job 108. The modified job-specific output engine settings 218c of the modified job environment 212 may be provided 910 to an output engine subunit 206 that corresponds to the imaging job 108.

The host communications subunit 220 may use the modified job-specific general settings 218a to perform tasks such as sending job progress/status notifications to the job originator, obtaining authorization to image the job, sending job accounting information to an accounting process, sending requests to the host, etc. The input source subunit 204 may use the modified job-specific input source settings 218b to process the imaging job 108. Similarly, the output engine subunit 206 may use the modified job-specific output engine settings 218c to process the imaging job 108.

An imaging job 108 may take input from a single input source subunit 104 and provide output to a single output engine subunit 106. Alternatively, an imaging job 108 may take input from multiple input source subunits 104 and/or provide output to multiple output engine subunits 106. In this case, the imaging job 108 may have multiple instances of either the input source settings section 322b and/or the output engine settings section 322c. In the case of multiple inputs, the imaging job 108 may also have multiple instances of the imaging data section 322d, a separate section 322d being associated with each input source. Each of the multiple input source settings 310b and/or output engine settings 310c may go through the same process, as described earlier, to produce the corresponding modified job environments 212. The job control manager may then pass the multiple instances of the input source and/or output engine modified job environments 212 to the job instance 638. The job instance 638 may then further create sub-processes, one per input source subunit 104 and/or output engine subunit 106. The job instance 638 may then pass the corresponding input source or output engine modified job environment 212 to each instance of the sub-process.

In another embodiment, the job settings may initially be generated as job centric. A process that is downstream from the job settings generation and upstream from the controllers may then receive the settings and reformat them into an input and output container.

In another embodiment, when an input source subunit 104 or output engine subunit 106 sends a job status/progress or accounting message, and the message contains settings information, the subunit specific portion of the message may include the corresponding copy of the input output container.

The systems and methods disclosed herein may provide several advantages over known techniques. For example, the systems and methods disclosed herein may allow more than one imaging job 108 to be processed in parallel, since each imaging job 108 may have its own instance of its modified job environment 212. In addition, a new setting added to an input source subunit 104 or to an output engine subunit 106 may be immediately available to all job types that utilize the input source subunit 104 or the output engine subunit 106, without replication of the implementation. Moreover, if a new input source subunit 104 or output engine subunit 106 is added, it may be possible for any job type to use the input source subunit 104 immediately without replication of the implementation.

Figure 10:
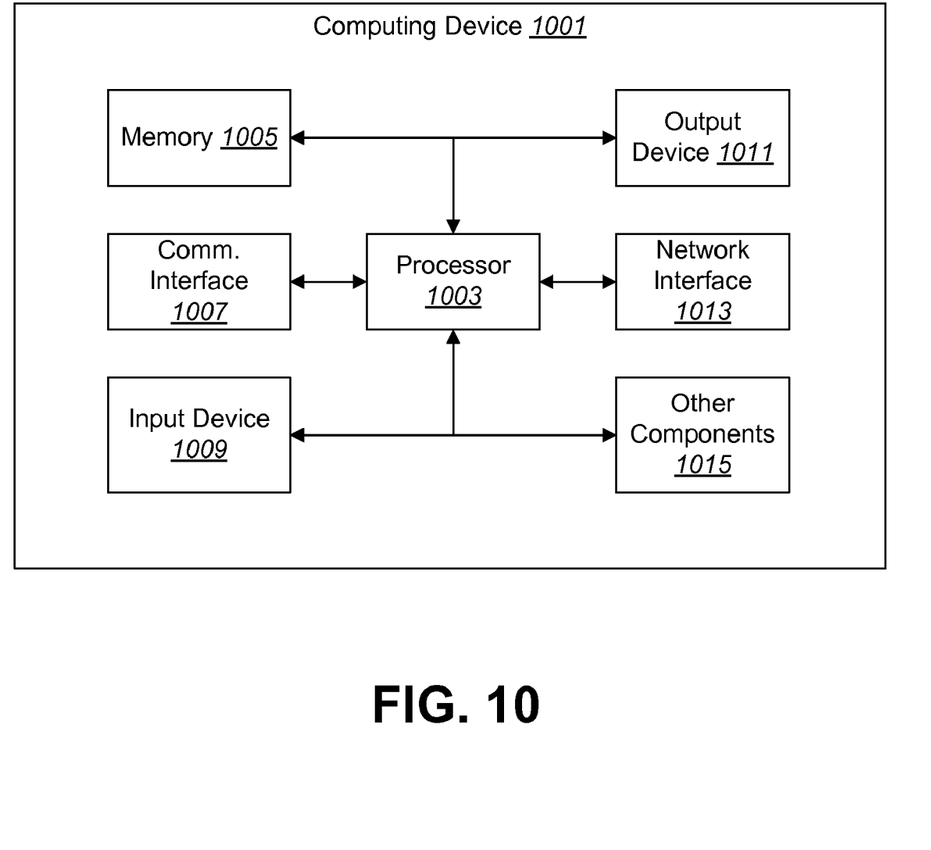
FIG. 10 illustrates various components that may be utilized in a computing device.

FIG. 10 illustrates various components that may be utilized in a computing device 1001. An imaging device 102 is an example of a computing device 1001. The illustrated components may be located within the same physical structure or in separate housings or structures.

The computing device 1001 may include a processor 1003 and memory 1005. The processor 1003 may control the operation of the computing device 1001 and may be embodied as a microprocessor, a microcontroller, a digital signal processor (DSP) or other device known in the art. The processor 1003 typically performs logical and arithmetic operations based on program instructions stored within the memory 1005. The instructions in the memory 1005 may be executable to implement the methods described herein.

The computing device 1001 may also include one or more communication interfaces 1007 and/or network interfaces 1013 for communicating with other electronic devices. The communication interface(s) 1007 and the network interface(s) 1013 may be based on wired communication technology, wireless communication technology, or both.

The computing device 1001 may also include one or more input devices 1009 and one or more output devices 1011. The input devices 1009 and output devices 1011 may facilitate user input. Other components 1015 may also be provided as part of the computing device 1001.

FIG. 10 illustrates only one possible configuration of a computing device 1001. Various other architectures and components may be utilized.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules, circuits and algorithm steps described in connection with the embodiments disclosed herein may be implemented as electronic hardware, computer software or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as limiting the scope of the claims.

The various illustrative logical blocks, modules and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the embodiments disclosed herein may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the embodiment that is being described, the order and/or use of specific steps and/or actions may be modified without departing from the scope of the claims.

While specific embodiments have been illustrated and described, it is to be understood that the claims are not limited to the precise configuration and components illustrated above. Various modifications, changes and variations may be made in the arrangement, operation and details of the embodiments described above without departing from the scope of the claims.

What is claimed is:

1. A method for efficiently handling imaging job settings, the method being implemented by an imaging device, the method comprising:
    receiving an imaging job;
    creating a modified job environment for the imaging job based on job-specific settings that are specified by the imaging job and also based on default settings of the imaging device, wherein the job-specific settings comprise job-specific general settings, job-specific input source settings, and job-specific output engine settings, wherein the job-specific general settings do not relate to a specific input source subunit or a specific output engine subunit;
    providing modified job-specific input source settings of the modified job environment to an input source subunit that corresponds to the imaging job, wherein the input source subunit uses the modified job-specific input source settings to process the imaging job;
    providing modified job-specific output engine settings of the modified job environment to an output engine subunit that corresponds to the imaging job, wherein the output engine subunit uses the modified job-specific output engine settings to process the imaging job;
    providing modified job-specific general settings of the modified job environment to a host communications subunit that corresponds to the imaging device, wherein the host communications subunit uses the modified job-specific general settings to convey information about the imaging job, wherein the modified job-specific general settings are not related to a specific input source subunit or a specific output engine subunit;

creating a job instance sub-process to manage processing of the imaging job; and passing imaging data for the imaging job and the modified job environment for the imaging job to the job instance sub-process.

2. The method of claim 1, wherein the imaging device supports multiple imaging functions.

3. The method of claim 1, further comprising associating the modified job environment with the imaging job.

4. The method of claim 1, wherein creating the modified job environment comprises:

retrieving default general settings for the imaging device; and merging job-specific general settings that are specified by the imaging job with the default general settings for the imaging device to produce modified job-specific general settings.

5. The method of claim 1, wherein creating the modified job environment comprises:

retrieving default input source settings of the input source subunit; and merging job-specific input source settings that are specified by the imaging job with the default input source settings to produce the modified job-specific input source settings.

6. The method of claim 1, wherein creating the modified job environment comprises:

retrieving default output engine settings of the output engine subunit; and merging job-specific output engine settings that are specified by the imaging job with the default output engine settings to produce the modified job-specific output engine settings.

7. The method of claim 1, wherein the input source subunit caches at least some of the modified job-specific input source settings.

8. The method of claim 1, wherein the output engine subunit caches at least some of the modified job-specific output engine settings.

9. The method of claim 1, further comprising parsing the imaging job to extract the job-specific settings.

10. The method of claim 1, further comprising creating a separate modified job environment and a separate job instance sub-process for each new imaging job.

11. The method of claim 1, wherein the imaging job takes input from multiple input source subunits.

12. The method of claim 1, wherein the imaging job provides output to multiple output engine subunits.

13. The method of claim 1, wherein the imaging job and the modified job environment are represented in an extensible markup language (XML) format.

14. An imaging device that is configured to efficiently handle imaging job settings, comprising:

a processor;

memory in electronic communication with the processor; and instructions stored in the memory, the instructions being executable to:

receive an imaging job, create a modified job environment for the imaging job based on job-specific settings that are specified by the imaging job and also based on default settings of the imaging device, wherein the job-specific settings comprise job-specific general settings, job-specific input source settings, and job-specific output engine settings, wherein the job-specific general settings do not relate to a specific input source subunit or a specific output engine subunit;

provide modified job-specific input source settings of the modified job environment to an input source subunit that corresponds to the imaging job, wherein the input source subunit uses the modified job-specific input source settings to process the imaging job;

provide modified job-specific output engine settings of the modified job environment to an output engine subunit that corresponds to the imaging job, wherein the output engine subunit uses the modified job-specific output engine settings to process the imaging job;

provide modified job-specific general settings of the modified job environment to a host communications subunit that corresponds to the imaging device, wherein the host communications subunit uses the modified job-specific general settings to convey information about the imaging job, wherein the modified job-specific general settings are not related to a specific input source subunit or a specific output engine subunit;

create a job instance sub-process to manage processing of the imaging job; and pass imaging data for the imaging job and the modified job environment for the imaging job to the job instance sub-process.

15. A non-transitory computer-readable medium comprising executable instructions for:

receiving an imaging job;

creating a modified job environment for the imaging job based on job-specific settings that are specified by the imaging job and also based on default settings of an imaging device, wherein the job-specific settings comprise job-specific general settings, job-specific input source settings, and job-specific output engine settings, wherein the job-specific general settings do not relate to a specific input source subunit or a specific output engine subunit;

providing modified job-specific input source settings of the modified job environment to an input source subunit that corresponds to the imaging job, wherein the input source subunit uses the modified job-specific input source settings to process the imaging job;

providing modified job-specific output engine settings of the modified job environment to an output engine subunit that corresponds to the imaging job, wherein the output engine subunit uses the modified job-specific output engine settings to process the imaging job;

providing modified job-specific general settings of the modified job environment to a host communications subunit that corresponds to the imaging device, wherein the host communications subunit uses the modified job-specific general settings to convey information about the imaging job, wherein the modified job-specific general settings are not related to a specific input source subunit or a specific output engine subunit;

creating a job instance sub-process to manage processing of the imaging job; and passing imaging data for the imaging job and the modified job environment for the imaging job to the job instance sub-process.

* * * * *